Figure 1:
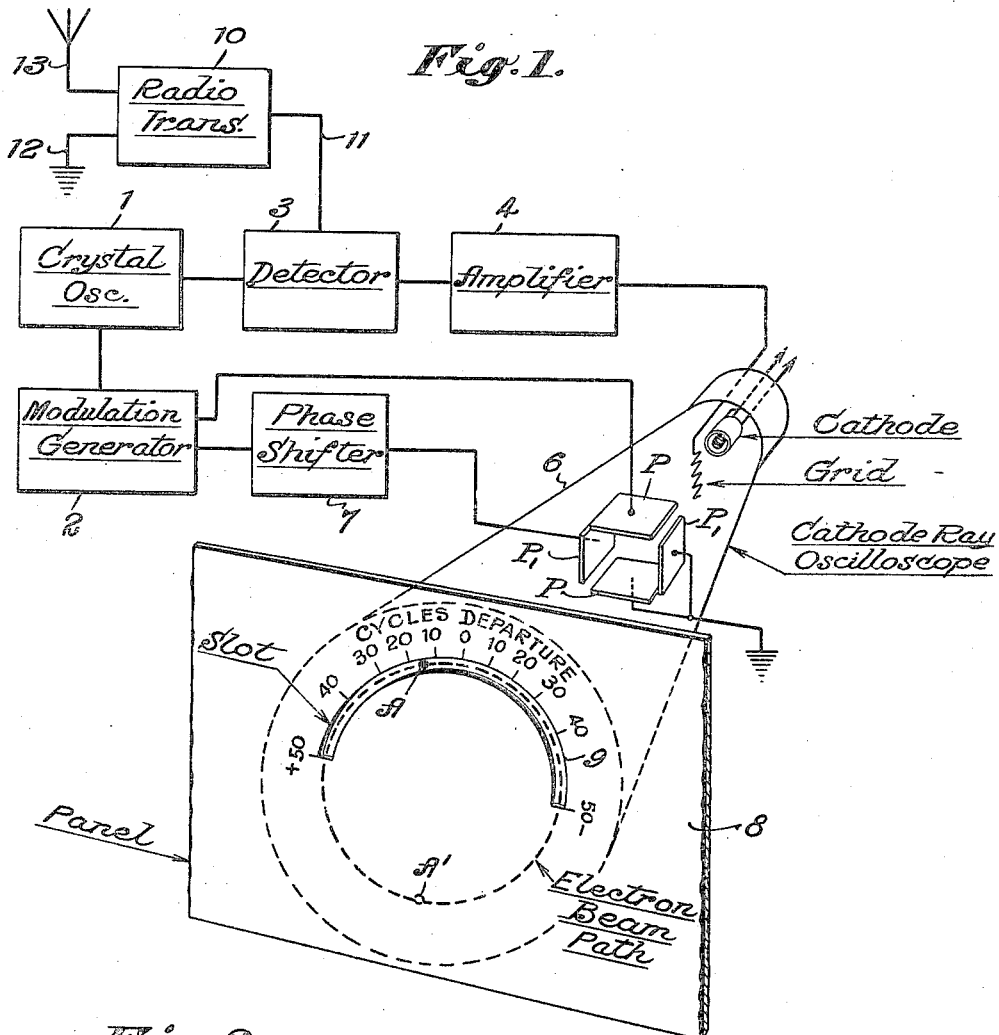

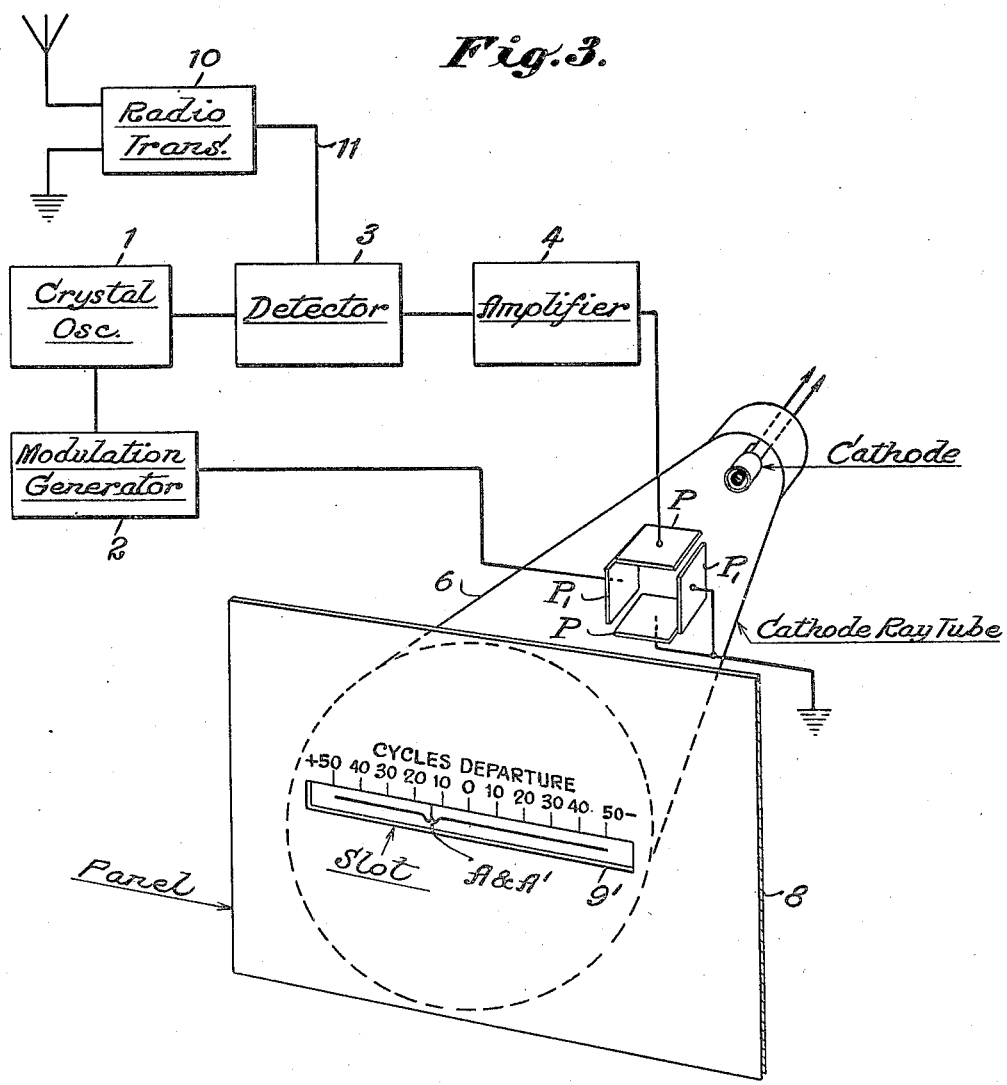

Patented July 20, 1943

2,324,915

UNITED STATES PATENT OFFICE 2,324,915

MONITOR SYSTEM

Orville E. Dow, Port Jefferson, N. Y., assignor to Radio Corporation of America, a corporation of Delaware Application February 25, 1942, Serial No. 432,251

13 Claims. (Cl. 250—17)

The present invention relates to improvements in frequency monitoring devices. More particularly, the invention is an electronic visual indicator or monitor which produces a visible indication on a suitable scale to indicate directly departures from an assigned frequency.

Governmental control of raido communication includes the assignment of channels or frequencies for transmitters. If such transmitters were permitted to materially deviate from their assigned frequencies, interference may result because the next adjacent channel may be occupied by another transmitter. By way of example, between 1500 kilocycles and 550 kilocycles there have been assigned numerous channels which are each 10 kilocycles wide. Since the carriers and their side bands of each transmitter require the full channel width, it is apparent that even small departures are apt to cause undesirable interference.

An accurate monitor is essential to insure operation of a transmitter within 10 cycles of an assigned frequency of 1,000,000 cycles.

Heretofore, it has been proposed to employ for frequency monitoring purposes a rotating element, such as a neon lamp, which rotates in synchronism with the modulating voltage. In such known schemes, the monitored signal and the output of a crystal oscillator standard are beat together and detected, and the detected output amplified and applied to the neon lamp to cause it to glow each time the two frequencies (i. e., signal frequency and crystal frequency) pass through zero beat. By means of a scale which is concentric with the path of the rotating neon lamp and a suitable initial adjustment, it has been possible to indicate the frequency variation of the signal on the scale. Reference is made to United States Patent No. 2,086,892, granted July 13, 1937, to L. E. Barton, for a detailed description of such known scheme.

An objection to the foregoing type of frequency monitor is that it employs moving elements which are objectionable for maintenance reasons.

The present invention overcomes the above mentioned objection by providing a frequency monitor which is entirely electronic in operation. This is achieved in the present invention by the use of a cathode ray tube in which the cathode ray or electron beam is cut off at all times except when the standard oscillator frequency and the signal carrier frequency are at zero beat. The fluorescent or phosphorescent screen of the cathode ray tube may, if desired, be placed behind an opaque panel with a suitable slot marked in the manner of a scale to indicate cycles departure. This slot may be circular or straight in form, depending upon the normal trace of the electron beam. The indication seen through the slot will be a small spot on the screen which will indicate departures in the order of three cycles or more.

Figure 2:
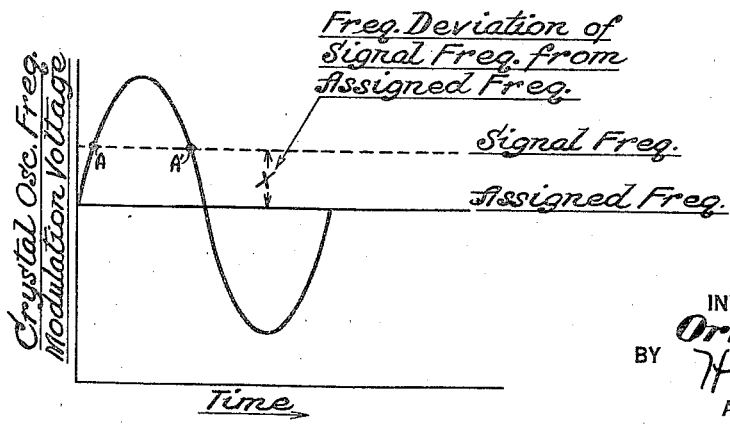

A more detailed description of the invention follows in conjunction with the drawings, wherein:

Figs. 1 and 3 diagrammatically illustrate two different embodiments of the present invention; and Fig. 2 graphically illustrates the points at which zero beats occurs between the signal frequency and the frequency of the standard oscillator.

In Fig. 1, a conventional radio transmitter has been represented by block 10. This transmitter is connected to a ground 12 and an antenna 13, in a conventional manner, for radiating signals. The transmitter may be modulated by television, telephonic or telegraphic signals. Energy from the transmitter is picked up by a suitable circuit connection diagrammatically represented by lead 11 for feeding to a detector 3 the picked up carrier frequency of the signal that is to be monitored. Obviously the signal picked-up on lead 11 and fed to detector 3 may be the radio frequency carrier or a lower frequency which is divided from the carrier frequency, and which bears a desired relationship to the radiated wave. A crystal controlled oscillator 1, which is carefully regulated with respect to temperature to insure a very accurate standard of frequency, and normally maintained at exactly the frequency of the signal appearing in lead 11, is frequency modulated by a suitable voltage from a modulation generator 2. This modulation voltage may be the 60-cycle power supply.

One method of phase modulating a crystal oscillator has been disclosed in United States Patent No. 2,067,081, granted January 5, 1937 to H. E. Goldstine, to which reference may be made for a description of how a crystal oscillator such as 1 can be modulated by a generator such as 2. Since the modulating voltage from generator 2 is a single frequency, the phase modulation produced in the circuit may be considered as frequency modulation. The output of the crystal oscillator 1 is then beat against the signal wave arriving from lead 11 by means of the detector 3. The output of the detector 3 is amplified in apparatus 4 and applied to the control grid G of a cathode ray tube 6 in such manner as to cause the cathode ray to be cut off at all times except when the crystal oscillator frequency and the signal frequency in lead 11 are at or very near zero beat. Putting it in other words, when these two frequencies are not at zero beat, the grid G of the cathode ray tube 6 is biased to prevent the electron beam from passing through the grid, in which case there will be no trace on the screen. The modulation voltage from generator 2 is applied directly to one set of deflecting plates P, P of the cathode ray tube 6 and through a phase shifting network 7 to the other set of deflecting plates P1, P1 (as shown). The phase shifting network 7, which may be of any suitable known form, shifts the modulating voltage 90°, so that the trace of the electron beam if it were on continuously in the cathode tube 6 on the phosphorescent screen is a circle as represented by the circular dotted line labeled "Electron beam path." The cathode ray tube 6 is preferably placed behind a panel 8 with a semi-circular slot 9 (as shown). A scale, indicating cycles departure, is formed around the slot. The degree of modulation of the crystal oscillator is adjusted by a gain control in the modulation generator tube, so that the position of the spot appearing on the screen in the slot 9 relative to the scale above the slot will indicate directly the variation of the signal from the assigned frequency. The maximum deviation between the crystal oscillator frequency and the signal frequency in lead 11 beating with the oscillator frequency will equal the scale range of frequencies.

In the operation of the monitor system, let us assume that the transmitter is in operation and that the crystal oscillator is turned "off." The carrier currents from the transmitter will produce currents in lead 11 which will bias the grid of the cathode ray tube 6 to prevent the electron beam from passing through the grid, in which condition there will be no trace on the screen. (Also the voltage to bias the electron beam off may be obtained from the D. C. power supply.) Now assume that the oscillator 1 is turned "on" and frequency modulated. During the zero beat intervals, that is when the output of the crystal oscillator sweeps through the signal frequency, then the amplifier 4, which is of low frequency response (let us say 10 cycles or less), will produce a short pulse in its output. This pulse will produce a positive voltage momentarily on the grid G of the cathode ray tube 6, thus allowing electron beam current to flow and produce a trace on the screen which will appear as a dot.

Since the crystal oscillator frequency will be at zero beat with the signal frequency twice during the modulation cycle, there will be two points A and A' on the screen where the electron beam is not blocked off. If the slot is semi-circular in form, only one spot A will be visible, because the other spot A' will be behind the opaque panel 8 and will not be seen. If the crystal oscillator frequency when the modulating voltage passes through zero is identical with the signal frequency appearing in lead 11, the spot A will appear in the slot immediately below the zero marking on the scale. If there is a difference in frequency between the crystal oscillator frequency for zero modulating voltage and the signal frequency in lead 11, the variation of the signal frequency from the assigned frequency can be read directly on the scale.

Fig. 2 graphically illustrates the points at which the pots A and A' will appear during zero beat between the crystal oscillator frequency and the signal frequency. The sine wave represents the crystal oscillator frequency during a modulation cycle of 1/60 of a second. The abscissa represents time, while the ordinate represents the crystal oscillator frequency modulation voltage. It will thus be seen that a frequency deviation X of the signal from the assigned frequency, the crystal oscillator frequency will cross the signal frequency at two locations A and A' during the positive half cycle. These are the locations which appear on the scale, under the conditions assumed for a given frequency deviation X. Obviously, during the negative half cycle there will be no positive pulse on the grid G and hence there cannot be any trace of the electron beam on the screen. Still referring to Fig. 2, if the signal frequency corresponds to the assigned frequency, the crystal oscillator frequency crosses the assigned frequency at points 180° apart, in which case spots A and A' will appear on the screen at locations immediately below the zero marking on the scale.

As mentioned above, the signal frequency in lead 11 can be either the carrier frequency or a sub-divided frequency, which normally corresponds with the frequency of the accurate crystal standard. By the same token, if desired, the output of the crystal oscillator frequency 1 can be multiplied to a higher frequency in order to correspond with the signal frequency appearing in lead 11. It will be evident that the signal frequency in lead 11 may be obtained either directly from the radio transmitter or from a suitable receiver circuit which collects the energy radiated from the transmitter in any suitable fashion.

Fig. 3 is a modification of Fig. 2 and differs therefrom in omitting the use of a phase shifter 7 and applying the modulation voltage from generator 2 to one set of deflecting plates P1, P1, while the output of the low frequency response amplifier 4 is applied to the other set of deflecting plates P, P. The electron beam is now no longer normally cut off, as in Fig. 1, and is on continuously, producing a straight line trace which is interrupted at points A where the two frequencies (the crystal oscillator frequency and the signal frequency) go through zero beat. It should be noted that spots A and A' are adjacent to each other and almost coincide in this arrangement. The slot in Fig. 3 represented by reference numeral 9' is straight in form, in order to indicate the straight line bidirectional trace of the cathode ray beam.

What is claimed is:

1. The method of indicating the frequency drift of a signal wave from an assigned frequency, which comprises beating the signal wave with oscillations of a reference frequency corresponding to the signal frequency, to be observed, modulating the frequency of said reference frequency oscillations with a low frequency voltage, and producing a change in the normal path of travel of a space flow of electrons during every modulation cycle solely at times when the oscillations of the reference frequency sweep through the signal frequency.

2. The method of indicating the frequency drift of a signal wave from an assigned frequency, which comprises generating oscillations of constant frequency corresponding to the frequency to be observed and which has a known relation to the assigned frequency, modulating the timing of said constant frequency oscillations with a low frequency voltage, beating the signal wave with said time modulated oscillations, initiating a space-current flow of electrons during every modulation cycle solely at times when the time modulated oscillations are at zero beat with the signal wave, and causing said space flow of electrons to produce a visible indication at such times.

3. The method of visibly indicating frequency drift of a carrier current by means of a cathode ray tube, which comprises generating a reference carrier current of the same frequency as the frequency of the current to be observed, generating low frequency beats including zero beat between said currents, modulating the frequency or phase of said reference carrier current with a low frequency current, producing a short pulse momentarily during zero beat, and applying said short pulse and said low frequency modulating current to different elements of said cathode ray tube for respectively influencing the number of electrons is and the path of travel of the electron ray in said tube, and producing an indication on the screen of said tube during every modulation cycle at a time the carrier current to be observed and the reference carrier current pass through zero beat.

4. The method of visibly indicating frequency drift of a carrier current by means of a cathode ray tube, which comprises generating a reference carrier current of the same frequency as the frequency of the current to be observed, generating low frequency beats including zero beat between said currents, modulating said reference carrier current with a low frequency current, rectifying the carrier current to be observed and normally biasing said cathode ray tube to electron current cut off with the resultant rectified currents, producing a short pulse momentarily during zero beat, and momentarily removing said cut-off bias by means of said pulse, whereby the resultant electron ray produces a visible indication on the screen of said tube.

5. The method of visibly indicating frequency drift of a carrier current by means of a cathode ray tube, which comprises generating a reference carrier current of the same frequency as the frequency of the current to be observed, generating low frequency beats including zero beat between said currents, modulating said reference carrier current with a low frequency current, rectifying the carrier current to be observed and normally biasing said cathode ray tube to electron current cut off with the resultant rectified currents, producing a short pulse momentarily during zero beat, applying said low frequency modulating current directly to one pair of deflecting plates of said tube, applying said modulating current at a 90° phase displacement to another pair of deflecting plates of said tube, and momentarily removing said cut-off bias by means of said pulse, whereby the resultant electron ray produces a visible indication on the screen of said tube.

6. A monitor for indicating frequency drift of a high frequency carrier current comprising a source of high frequency current of a frequency equal to the assigned frequency of said carrier current, a modulation generator for modulating the frequency of said source, a detector for mixing the oscillations from said source with said high frequency carrier current, whereby frequency beats are produced, a low frequency response amplifier coupled to the output of said detector, a cathode ray tube having a control grid, two pairs of deflecting plates with planes 90° displaced, and a screen adapted to luminesce when impinged by an electron stream, a connection from the output of said amplifier to said grid, whereby said cathode ray tube is normally biased to cut off except at times of zero beat between the carrier current and the source current during two instants of each modulation cycle, means for applying voltage from said modulation generator to said two pairs of plates, the voltage on one pair being at 90° relation to the voltage on the second pair, whereby the trace of the electron ray in the absence of cut-off bias would be a circle, and a scale of at least partially circular form adjacent a portion of said electron ray trace for indicating the frequency drift of said carrier current.

7. A monitor in accordance with claim 6, characterized in this that said modulation generator is a 60 cycle power supply source, and said scale is a semicircle having a range of frequencies equal to the maximum deviation between the source of high frequency current and the frequency of the carrier.

8. A monitor for indicating frequency drift of a high frequency carrier current comprising a source of high frequency current of a frequency equal to the assigned frequency of said carrier current, a modulation generator for modulating the frequency of said source, a detector for mixing the oscillations from said source with said high frequency carrier current, whereby audio frequency beats are produced, a low frequency response amplifier coupled to the output of said detector, a cathode ray tube having two pairs of deflecting plates and a screen adapted to luminesce when impinged by a cathode ray, a connection from said modulation generator to one pair of deflecting plates, and a connection from the output of said amplifier to the other pair of deflecting plates, whereby the trace of the cathode ray in said tube due to the first pair of deflecting plates is bidirectional and in a straight line, and a scale adjacent said trace for indicating the frequency drift of said carrier current, said indication being a departure from said straight line trace caused by the voltage output of said amplifier on the second pair of deflecting plates.

9. A monitor for indicating frequency drift of a high frequency carrier current comprising a source of high frequency current of a frequency equal to the assigned frequency of said carrier current, a relatively low frequency modulation generator for modulating the frequency of said source, a detector for mixing the oscillations from said source with said high frequency carrier current, whereby audio frequency beats are produced, a low frequency response amplifier coupled to the output of said detector, a cathode ray tube having at least one pair of deflecting plates and a screen adapted to luminesce when impinged by the cathode ray, a circuit for applying voltage from said modulation generator to said pair of deflecting electrodes, a connection from the output of said amplifier to an element in said tube which affects said cathode ray, and a scale adjacent the normal trace of said ray on said screen for indicating the frequency drift of said carrier current.

10. A monitor for indicating frequency drift of a high frequency carrier current comprising a source of high frequency current of a frequency equal to the assigned frequency of said carrier current, a relatively low frequency modulation generator for modulating the frequency of said source, a detector for mixing the oscillations from said source with said high frequency carrier current, whereby audio frequency beats are produced, a low frequency response amplifier coupled to the output of said detector, a cathode ray tube having at least one pair of deflecting plates and a screen adapted to luminesce when impinged by the cathode ray, a circuit for applying voltage from said modulation generator to said pair of deflecting electrodes, a connection from the output of said amplifier to a control grid in said tube, and a scale adjacent the normal trace of said ray on said screen for indicating the frequency drift of said carrier current.

11. A monitor for indicating frequency drift of a high frequency carrier current comprising a source of high frequency current of a frequency equal to the assigned frequency of said carrier current, a relatively low frequency modulation generator for modulating the frequency of said source, a detector for mixing the oscillations from said source with said high frequency carrier current, whereby audio frequency beats are produced, a low frequency response amplifier coupled to the output of said detector, a cathode ray tube having at least one pair of deflecting plates and a screen adapted to luminesce when impinged by the cathode ray, a circuit for applying voltage from said modulation generator to said pair of deflecting electrodes, a connection from the output of said amplifier to an element in said tube which affects said cathode ray, an opaque panel in front of the screen of said tube, said panel having a slot registering with at least a portion of the normal trace of said ray on said screen, and a scale on said panel adjacent said slot for indicating the frequency drift of said carrier current.

12. A monitor for indicating frequency drift, comprising a crystal oscillator producing oscillations of a frequency equal to the assigned frequency of the current to be observed, a low frequency modulation generator of the order of sixty cycles for modulating the frequency of said crystal oscillator, a detector for mixing the output from said crystal oscillator with the currents to be observed, whereby audio frequency beats are produced, a low frequency response amplifier of the order of ten cycles or less coupled to the output of said detector, a cathode ray tube having at least one pair of deflecting plates and a screen adapted to luminesce when impinged by the cathode ray, a circuit for applying voltage from said modulation generator to said pair of deflecting electrodes, a connection from the output of said amplifier to an element in said tube which affects said cathode ray, and a scale adjacent the normal trace of said ray on said screen for indicating the frequency drift of said carrier current.

13. The method of indicating the frequency drift of a signal wave from an assigned frequency, which comprises generating oscillations of constant frequency corresponding to the frequency to be observed and which has a known relation to the assigned frequency, modulating the timing of said constant frequency oscillations with a low frequency voltage, beating the signal wave with said time modulated oscillations, initiating a space current flow of electrons, and producing a change in the normal path of travel of said space current flow of electrons during every modulation cycle solely at times when the time modulated oscillations are at zero beat with the signal wave.

ORVILLE E. DOW.